(12) United States Patent
Räsänen

(10) Patent No.: US 7,558,239 B1
(45) Date of Patent: Jul. 7, 2009

(54) DUAL FALLBACK IN CIRCUIT-SWITCHED MULTIMEDIA CALL SETUP

(76) Inventor: Juha A. Räsänen, Pensaskertuntie 8A, Espoo (FI) FIN-02660

( * ) Notice: Subject to any disclaimer, the term of this patent is extended or adjusted under 35 U.S.C. 154(b) by 0 days.

(21) Appl. No.: 10/240,062

(22) PCT Filed: Apr. 3, 2000

(86) PCT No.: PCT/EP00/02951

§ 371 (c)(1),
(2), (4) Date: Oct. 29, 2002

(87) PCT Pub. No.: WO01/76288

PCT Pub. Date: Oct. 11, 2001

(51) Int. Cl.
*H04Q 7/24* (2006.01)

(52) U.S. Cl. .................. 370/338; 370/401; 370/465

(58) Field of Classification Search ............... 370/338, 370/401, 465, 466
See application file for complete search history.

(56) References Cited

U.S. PATENT DOCUMENTS

| | | | | |
|---|---|---|---|---|
| 5,463,616 A * | 10/1995 | Kruse et al. | ........... | 370/276 |
| 5,699,413 A * | 12/1997 | Sridhar | ........... | 379/93.09 |
| 6,295,302 B1 * | 9/2001 | Hellwig et al. | ........... | 370/522 |
| 6,320,862 B1 * | 11/2001 | Nitta | ........... | 370/401 |
| 6,504,839 B2 * | 1/2003 | Valentine et al. | ........... | 370/354 |
| 6,987,974 B1 * | 1/2006 | Mostafa et al. | ........... | 455/455 |

FOREIGN PATENT DOCUMENTS

EP 0 583 094 A2 2/1994

OTHER PUBLICATIONS

Technical Specification Group Core Network: "3G TS 29.007 V3.4.0 General requirements on interworking between the Public Land Mobile Network (PLMN) and the Integrated Services Digital Network (ISDN) or Public Switched Telephone Network (PSTN) (Release 1999)" Mar. 2000, 3GPP XP002154255.

Lindbergh D: "The H.324 Multimedia Communication Standard" IEEE Communications Magazine, US, IEEE Service Center, Piscataway, NJ, vol. 34, No. 12, Dec. 1, 1996, pp. 46-51, XP000636453.

Smith, Larrabee M.: "Standardization of provisions for ISDN/PSTN interworking of data terminals" International Conference on Data Transmission—Advances in Modem and ISDN Technology and Applications, Sep. 23-25, 1992, pp. 100-105, XP002154254.

Ove A Z: "Datendienste IM GMS" Elektrotechnik UND Informationstechnik, at, Springer Verlag, Wien, vol. 112, No. 1, 1995, pp. 20-32, XP000494845.

* cited by examiner

*Primary Examiner*—Hassan Kizou
*Assistant Examiner*—Bo Hui A Zhu

(57) ABSTRACT

A method and apparatus for establishing a connection, wherein a response to a call setup request of a first type of connection is checked by a signaling control unit and a signaling of a second type of connection received from the other party of the connection is monitored. A third type of connection is set up if the result of the checking step indicates that the setup was not successful. The second type of connection may then be set up when a signal indicating a support of the second type of connection has been detected in the monitoring operation within a predetermined time period. Since a preliminary fallback to the third connection is performed irrespective of the monitoring operation, a more common fallback case can be freed from a monitoring delay.

32 Claims, 4 Drawing Sheets

DUAL FALLBACK IN CIRCUIT-SWITCHED MULTIMEDIA CALL SETUP

PRIORITY CLAIM

This is a national stage of PCT application No. PCT/EP00/02951, filed on Apr. 3, 2000. Priority is claimed on that application.

FIELD OF THE INVENTION

The present invention relates to a method and apparatus for establishing a connection in a communication network, such as a mobile network or any other telecommunication or data communication network.

BACKGROUND OF THE INVENTION

In recent years, multimedia telephone terminals which can be connected to fixed networks have been developed. These terminals provide real-time video, audio, or data, or any combination thereof, between two multimedia telephone terminals over a voice band network connection. Communication may be either one-way or two-way. Furthermore, the multimedia telephone terminals can be integrated into PCs or work stations, or can be stand-alone units.

Interworking between PLMNs (Public Land Mobile Networks) and PSTNs (Public Switched Telephone Networks) is currently being specified in third generation mobile systems. One of the items to be specified is a call type where a video/multimedia call is started with a speech phase, and during the speech phase the call is modified into a multimedia call according to the ITU-T H.324 recommendation.

Furthermore, fallback procedures have been proposed to be used in circuit-switched multimedia call setups in order to save the call in case the called party or an intermediate network does not support the requested service. To achieve this, a fallback connection, i.e. another type of connection such as a modem connection, is determined, wherein the fallback connection is established without disconnecting the calling party or performing a time-consuming error processing or messaging at the end terminals. As an example, the user may always request a fully digital UDI/RDI (Unrestricted/Restricted Digital Information) multimedia connection. Thus, the user does not have to know the capabilities of the called terminal. If it is determined, e.g. based on the ISUP (ISDN User Part) backward indicators, that the called terminal does not support UDI/RDI calls, a fallback procedure to a 3.1 kHz modem-based multimedia connection is initiated, i.e. an IWF (InterWorking Function) modem is connected to the line and the mobile traffic is modified to correspond to the (lower) data rate used by the modem connection. If there is no modem at the called party, the call is turned to a speech call, i.e. the IWF modem resource is released and the mobile traffic channel is modified to the speech modem.

However, such a fallback procedure from the UDI/RDI multimedia connection leads to the problem that the checking of the possible modem support at the called party takes several seconds. Thus, fallbacks from UDI/RDI to speech will always suffer from the monitoring delay of the modem resource. Thus, the quality of service faced by the users is reduced by the present fallback solutions.

SUMMARY OF THE INVENTION

It is therefore an object of the present invention to provide a method and apparatus for establishing a connection, by means of which the quality of service can be enhanced.

This object is achieved by a method for establishing a connection in a communication network, comprising the steps of:
transmitting a setup request for a first type of connection towards the other party of the connection;
checking a response to the setup request;
monitoring a signaling of a second type of connection received from the other party;
setting up a third type of connection, when the result of the checking step indicates that the setup was not successful; and
setting up the second type of connection when a signal indicating a support of the second type of connection has been detected in the monitoring step within a predetermined time period.

Furthermore, the above object is achieved by an apparatus for establishing a connection in a communication network, comprising:
signaling means for transmitting a setup request for a first type of connection towards the other party of the connection;
monitoring means for monitoring a signaling of a second type of connection received from the other party;
checking means for checking a response to the setup request and a result of the monitoring operation; and
connection control means for setting up a third type of connection if the checking result of the checking means indicates that the setup was not successful, and for setting up the second type of connection if the checking result of the checking means indicates that a signal indicating a support of the second type of connection has been detected by the monitoring means within a predetermined time period.

Accordingly, a dual fallback solution is provided, wherein a first fallback to the third type of connection, e.g. the speech connection, is performed irrespective of the time-consuming monitoring operation, and an additional second fallback to the second type of connection, e.g. the modem connection, is then performed if the monitoring operation indicates within the predetermined time period that the other party supports the second type of connection. Hence, the two fallback initiations are decoupled from each other. If the first fallback is a fallback case with a higher probability, the more common fallback (e.g. from UDI/RDI to speech) can be freed from the monitoring delay required for detecting whether the other party supports the second connection. Thus, a delay of several seconds can be eliminated in the more probable fallback case, and the quality of service observed by the user can be enhanced Preferably, the monitoring step may be performed in response to the result of the checking step. Thus, the monitoring means is connected on line by the connection control means in response to the checking result of said checking means. Thereby, an unnecessary reservation of the monitoring function (e.g. IWF resource) can be prevented, since the monitoring can be restricted to those cases where the setup of the first connection was not successful. In this case, the response may be received as an outband signaling.

As an alternative, the monitoring step may be started independent of said checking step (e.g. during the transmission step). Thus, the monitoring means is connected on line by the connection control means during the transmission operation. In this case, the response may be received as a inband signaling.

The first type of connection may be a UDI/RDI multimedia or video connection, the second type of connection may a modem multimedia or video connection and the third type of connection may be a speech connection. Thus, the undesired waiting period until it has been detected whether there is a suitable modem provided at the called end can be prevented, since the speech connection is immediately established after the receipt of a negative response regarding the multimedia or video connection, e.g. RDI or UDI connection.

Preferably, the monitoring operation may be an interworking processing. Then, the monitoring means may be an interworking modem. The interworking modem may be connected in a through connection mode and arranged to monitor modem tones or signals without manipulating the information flow.

Furthermore, the predetermined time period may be measured by using a timer.

In particular, the connection may be a connection between a mobile terminal and a network terminal of a fixed network. In this case, the apparatus may be a mobile switching center.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
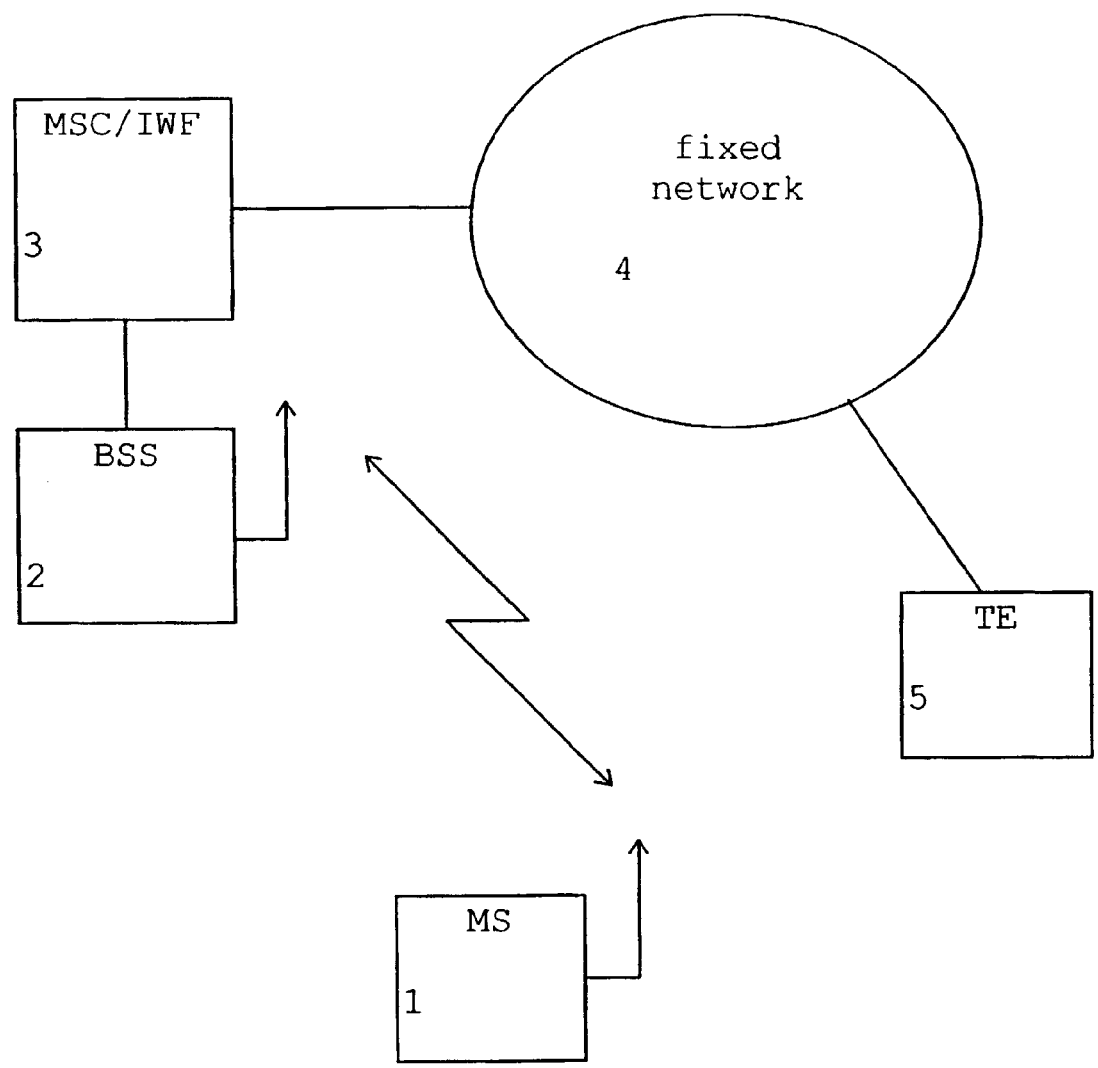
FIG. 1 shows a basic block diagram of a mobile network connected to a fixed network.

In the following, the present invention will be described on the basis of a preferred embodiment which relates to a multimedia connection between a fixed network 4 and a mobile network, as shown in FIG. 1.

According to FIG. 1, a multimedia terminal equipment (TE) 5 is connected via the fixed network 4, such as a Public Switched Telephone Network (PSTN) or the like, to a mobile terminal or mobile station (MS) 1 having a multimedia capability. The MS 1 is radio-connected to a known Base Station Subsystem (BSS) 2 which is connected to a Mobile Switching Center (MSC/IWF) 3 having an interworking function (IWF). The interworking function is provided for adapting protocol features of the mobile network to protocol features of the fixed network 4. The MSC/IWF 3 is arranged to automatically establish suitable fallback connections in case the other party does not support a multimedia call.

According to the preferred embodiment, the MCS/IWF 3 is arranged to reduce the delay time in the fallback case by initiating a first fallback procedure to a speech connection irrespective of the result of an initiating of a second fallback operation to a modem connection. Thus, the speech connection is established while the modem signal monitoring operation is performed. When the monitoring operation then leads to the result that the modem connection can be established, the speech connection is modified to the modem connection.

Figure 2:
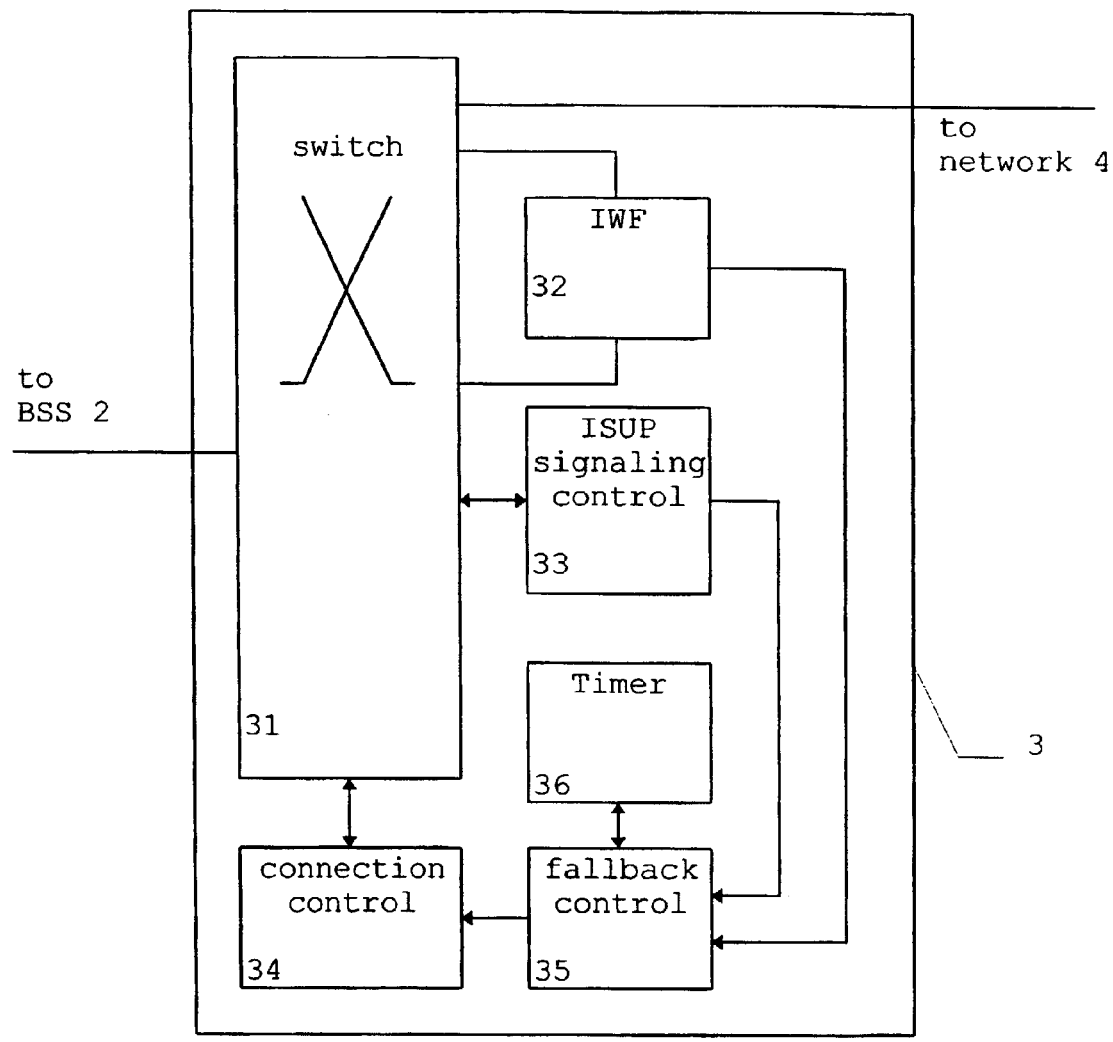
FIG. 2 shows a basic block diagram of a mobile switching center according to the preferred embodiment of the present invention.

FIG. 2 shows a principle block diagram of the MSC/IWF 3 according to the preferred embodiment of the present invention. According to FIG. 2, the MSC/IWF 3 comprises a switch 31 for performing a switching operation between the BSS 2 and the fixed network 4, so as to establish a requested connection and to connect a modem resource of an IWF unit 32 on line, i.e. either parallel to the end-to-end traffic channel or in a through connection mode only monitoring but not manipulating the information flow or data traffic. Moreover, the switch 31 may connect an ISUP signaling control unit 33 to a respective connection so as to receive a response to a setup request of a multimedia or video connection and to determine whether a connection end (e.g. the MS 1 or the TE 5) supports the multimedia or video connection (e.g. based on received ISUP backward indicators). If the multimedia or video connection is not supported at the other connection end, a standard in-call modification procedure is initiated so as to initiate corresponding fallback procedures.

The switching operation of the switch 31 is controlled by a connection control unit 34 arranged to control the setup and establishment of the switched connections. Furthermore, the IWF unit 32 is arranged to perform a transcoding operation, an error processing adaptation and a rate matching between the mobile network and the fixed network 4. Moreover, the modem resources of the IWF unit 32 perform negotiation processings in order to determine modem capabilities and to set up modem connections to the fixed network 4.

According to the preferred embodiment, the IWF unit 32 is connected to a fallback control unit 35 which is connected to the IWF unit 32 and to the ISUP signaling control unit 33, and arranged to check the result of the negotiation performed by a respective IWF modem of the IWF 32 and to check the kind of setup response received by the ISUP signaling control unit 33. Additionally, the fallback control unit 35 is connected to the connection control unit 34, so as to control the connection control unit 34 in order to achieve a switching operation to establish a multimedia connection or to initiate fallback procedures to a speech connection or a modem connection.

In the following, two examples of call establishments performed by the MSC/IWF 3 are described with reference to the flow diagrams shown in FIGS. 3 and 4.

Figure 3:
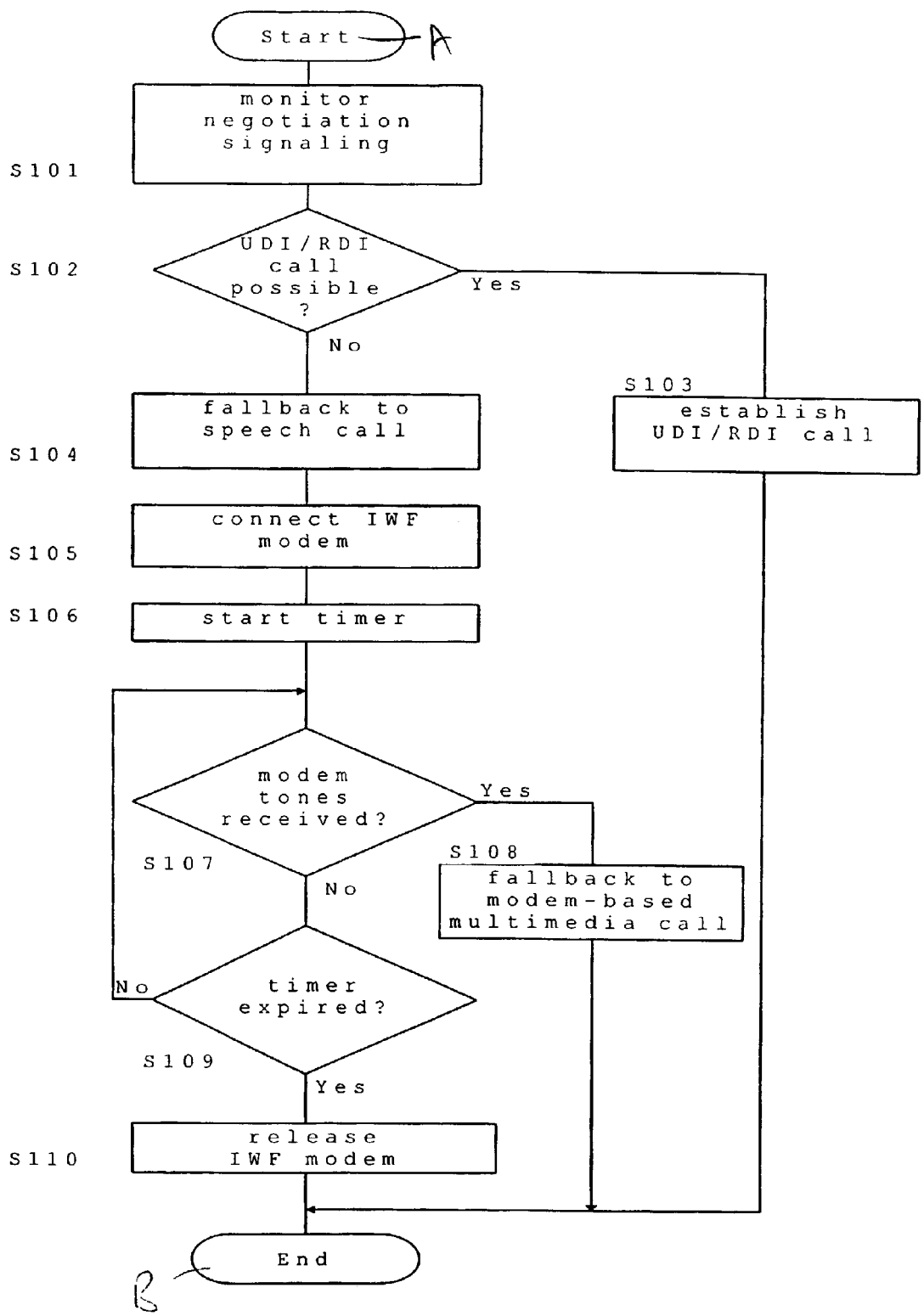
FIG. 3 shows a flow diagram of a first example of a procedure for establishing a multimedia connection according to the preferred embodiment of the present invention.
Figure 4:
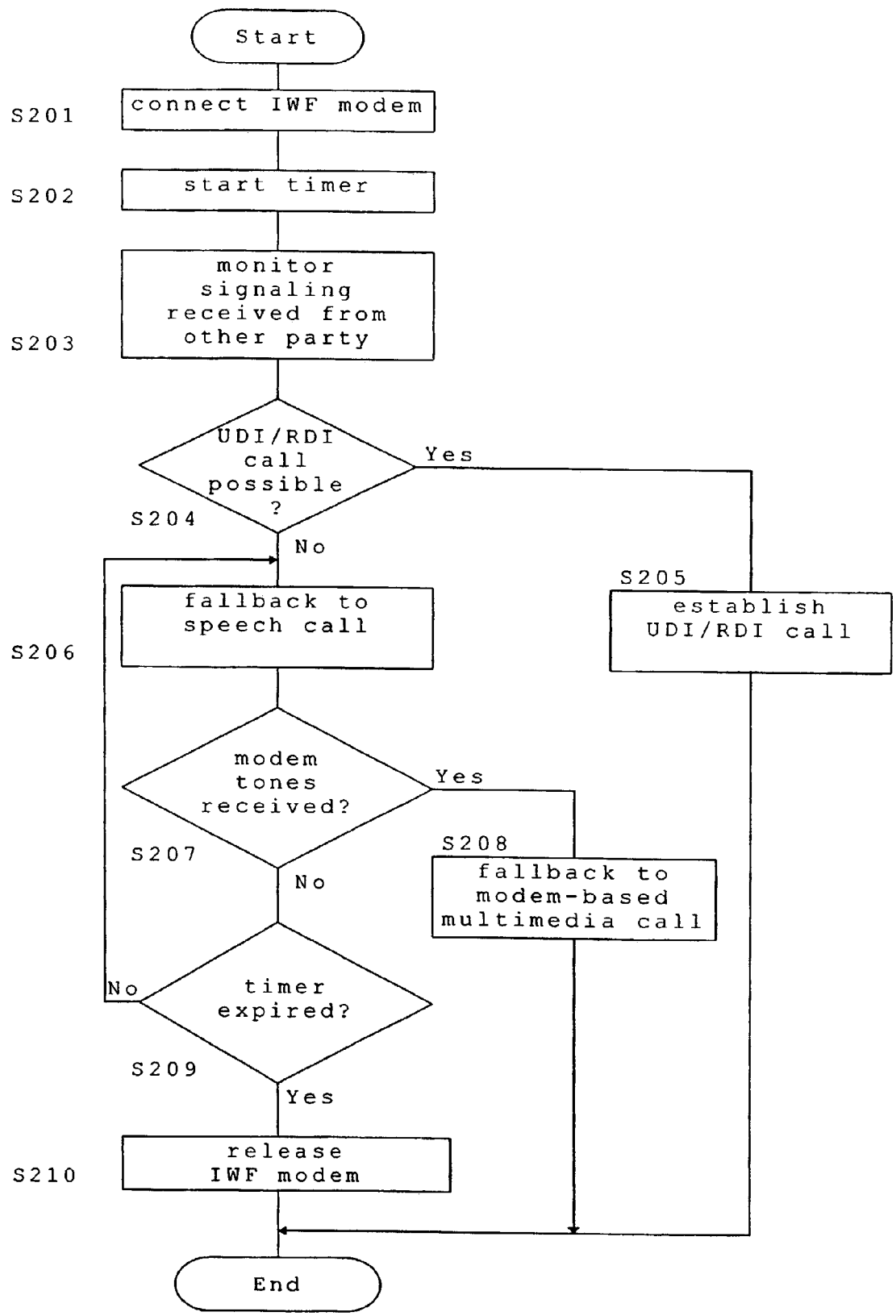
FIG. 4 shows a flow diagram of a second example of a procedure for establishing a multimedia connection according to the preferred embodiment of the present invention.

In FIG. 3, a first example for a call establishment is shown, wherein the IWF unit 32 is connected in response to the result of an initial outband signaling indicated a multimedia or video capability of the called end.

Initially, a multimedia UDI/RDI call, e.g. a H.324 call, is requested and a corresponding setup request is transmitted to the MSC/IWF 3. The type of the requested call may be indicated in the BCIE (Bearer Capability Information Element) of the setup message.

In step S101, the ISUP signaling control unit 33 monitors the signaling response received from the other party (e.g. based on the ISUP backward indicators) and supplies a corresponding information indicating the kind of response to the fallback control unit 35. If the ISUP signaling control unit 33 determines in step S102 that an establishment of the UDI/RDI call is possible, the ISUP signaling control unit 33 initiates a signaling so as to establish the UDI/RDI call (step S103), and a fallback procedure is not initiated.

Otherwise, if a UDI/RDI call is not possible, the fallback control unit 35 receives a corresponding information from the ISUP signaling control unit 33 and controls the connection control unit 34 so as to initiate a fallback procedure to a speech call using the standard in-call modification procedure (step S104). Furthermore, the fallback control unit 35 controls the connection control unit 34 so as to connect a corresponding modem resource of IWF unit 32 in parallel or in a through connection mode to the established connection (S105). Then, the fallback control unit 35 starts a timer 36 (step S106) counting a predetermined time period (e.g. a few seconds). Meanwhile, the IWF modem performs a monitoring operation so as to detect any modem tones or signals received from the other end.

In step S107, the fallback control unit 35 checks whether an information indicating that the negotiation performed by the IWF modem was successful, or not, has been issued by the IWF unit 32. If so (i.e. relevant modem tones or signals have been received), the called party supports the modem-based multimedia or video connection, and the fallback control unit 35 controls the connection control unit 34 so as to modify the established speech connection to a multimedia/video data rate according to the IWF modem, i.e. so as to perform a second fallback from the speech connection to the modem-based multimedia connection (step S108).

If it is determined in step S107, that no modem tones or signals have been received, the fallback control unit 35 checks the counting result of the timer 36 (step S109). If the timer 36 has expired, the fallback control unit 35 controls the connection control unit 34 so as to release the IWF unit 32, since the called party is a plain speech phone. Thus, the speech connection established in step S104 is maintained. On the other hand, if the timer 36 has not yet expired, the flow returns to step S108 and the checking of the monitoring operation is continued until the timer 36 has expired or a modem tone or signal has been received.

In the following, the second example of an establishing operation of a multimedia or video call is described with reference to FIG. 4. The second example is preferably used for more complicated fallback cases based on inband signalings.

Contrary to the first example, the IWF modem of the IWF unit 32 is directly connected to the line by the connection control unit 34 to monitor the modem tones or signals of a possible modem of the called party, in response to a setup of a multimedia/video call determined by the fallback control unit 35 (step S201). Then, the fallback control unit 35 starts the timer 36 (step S202), and the ISUP signaling control unit 33 monitors the outband signaling response received from the other party (step S203). It is to be noted that the monitoring operation may be started simultaneously with the connection of the IWF modem.

If the ISUP signaling control unit 33 determines in step S204 that an establishment of the UDI/RDI call is possible, the ISUP signaling control unit 33 initiates a signaling so as to establish the UDI/RDI call (step S205), and a fallback procedure is not initiated.

Otherwise, if a UDI/RDI call is not possible, the fallback control unit 35 receives a corresponding information from the ISUP signaling control unit 33 and controls the connection control unit 34 so as to initiate a fallback procedure to a speech call using the standard in-call modification procedure (step S206).

The remaining steps S207 to S210 correspond to the respective steps S107 to S110 of the first example such that a description of these can be omitted here.

Thus, according to the second example, the IWF modem is connected in any case from the very beginning of call.

Both first and second examples provide the advantage that the fallback to the speech connection is directly initiated irrespective of the monitoring result of the IWF modem. Thereby, the more probable speech call can be quickly established, while the monitoring operation concerning the less probable modem capability is performed in the background. Only in case a modem capability is actually detected, an additional fallback to the modem-based multimedia/video connection is performed.

It is to be noted, that the processing performed by the MSC/IWF 3 may be implemented by a control program of a microprocessor such as a CPU, wherein the respective blocks 33 to 36 are replaced by corresponding software routines stored in a memory allocated to the CPU.

Furthermore, the connection establishment processing described in the above preferred embodiment can be performed in any communication network (e.g. telecom or datacom networks) to which terminals supporting different types of connections are connected, and is not restricted to a mobile switching center of a mobile network.

The above description of the preferred embodiment and the accompanying drawings are only intended to illustrate the present invention. The preferred embodiment of the invention may vary within the scope of the attached claims.

In summary, the present invention relates to a method and apparatus for establishing a connection, wherein a response to a call setup request of a first type of connection is checked and a signaling of a second type of connection received from the other party of the connection is monitored. A third type of connection is set up if the result of the checking step indicates that the setup was not successful. The second type of connection may then be set up when a signal indicating a support of the second type of connection has been detected in the monitoring operation within a predetermined time period. Since a preliminary fallback to the third connection is performed irrespective of the monitoring operation, a more common fallback case can be freed from a monitoring delay.

What is claimed is:

1. A method for establishing a connection in a communication network, comprising:
   monitoring negotiation signaling received at a signaling control unit;
   determining whether a first type of call connection is supported based on the monitoring of the negotiation signaling;
   implementing a call through the first type of call connection if the negotiation signaling indicates that the first type of call connection is supported;
   simultaneously initiating a second type of call connection and a third type of call connection if the negotiation signaling indicates that the first type of call connection is not supported;
   determining, based on a received signal, whether the second type of call connection is supported;
   if the second type of call connection is supported, implementing the call through the second type of call connection; and
   if the second type of call connection is not supported, maintaining the third type of call connection.

2. The method of claim 1, further comprising monitoring for the received signal if the first type of call connection is not supported.

3. The method of claim 1, wherein said negotiation signaling is received as outband signaling.

4. The method of claim 1, further comprising monitoring for the received signal independent of determining whether the first type of call connection is supported.

5. The method of claim 1, wherein said negotiation signaling is received as inband signaling.

6. The method of claim 1, wherein said first type of call connection is a multimedia or video connection.

7. The method of claim 1, wherein said second type of call connection is a modem connection.

8. The method of claim 1, wherein said third type of call connection is a speech connection.

9. The method of claim 1, wherein said first type of call connection is a restricted digital information connection or an unrestricted digital information connection.

10. The method of claim 1, wherein said monitoring of the negotiation signaling is interworking processing.

11. The method of claim 1, wherein said call is between a mobile terminal and a network terminal, wherein the network terminal is connected to a fixed network.

12. The method of claim 1, wherein said first type of call connection is compliant with ITU-T Recommendation H.324.

13. The method of claim 1, further comprising monitoring for the received signal without manipulating information flow.

14. The method of claim 1, wherein said received signal comprises a modem signal.

15. The method of claim 1, further comprising maintaining the third type of call connection if the received signal is not received within a predetermined time period.

16. An apparatus for establishing a connection in a communication network, comprising:
    a signaling control unit configured to transmit negotiation signaling for initiating a call;
    a checking unit configured to determine, based on a response to said negotiation signaling, whether a first type of call connection is supported; and
    a connection control unit configured to
        automatically implement a first fallback procedure comprising initiating a third type of call connection if the first type of call connection is not supported;
        automatically implement a second fallback procedure if the first type of call connection is not supported, wherein the second fallback procedure comprises determining whether a second type of call connection is supported, and, if the second type of call connection is supported, implementing the call through the second type of call connection; and
    if the first type of call connection and the second type of call connection are not supported, maintain the third type of call connection.

17. The apparatus of claim 16, further comprising a monitoring unit configured to monitor incoming signaling for a signal indicating that the second type of call connection is supported, wherein the monitoring unit is connected on line by said connection control unit if the first type of call connection is not supported.

18. The apparatus of claim 16, wherein said response is received as outband signaling by the signaling control unit.

19. The apparatus of claim 16, further comprising a monitoring unit configured to monitor incoming signaling for a signal indicating that the second type of call connection is supported, wherein the monitoring unit is connected on line by said connection control unit independent of whether the first type of call connection is supported.

20. The apparatus of claim 16, wherein said response is received as inband signaling by the signaling control unit.

21. The apparatus of claim 16, wherein said first type of call connection is a multimedia or video connection.

22. The apparatus of claim 16, wherein said second type of call connection is a modem connection.

23. The apparatus of claim 16, wherein said third type of call connection is a speech connection.

24. The apparatus of claim 16, wherein said first type of call connection is a restricted digital information connection or an unrestricted digital information connection.

25. The apparatus of claim 17, wherein said monitoring unit is an interworking modem.

26. The apparatus of claim 25, wherein the signal comprises one or more modem tones, and further wherein said interworking modem is configured to monitor for the one or more modem tones without manipulating information flow.

27. The apparatus of claim 16, further comprising:
    a timer for use in determining whether a signal is received within a predetermined time period, wherein the signal is used to determine whether the second type of call connection is supported.

28. The apparatus of claim 16, wherein said apparatus is a mobile switching center.

29. A method for establishing a connection in a communication network, comprising:
    automatically initiating a second type of call connection;
    using a timer to measure a predetermined time period;
    monitoring signaling information for a signal, wherein the signaling information is associated at least in part with the second type of call connection, and further wherein the signal indicates that the second type of call connection is supported;
    determining whether a first type of call connection is supported based on the signaling information;
    implementing a call through the first type of call connection if the signaling information indicates that the first type of call connection is supported;
    automatically initiating a third type of call connection if the first type of call connection is not supported;
    if the first type of call connection is not supported and if the signal is received within the predetermined time period, implementing the call through the second type of call connection; and
    maintaining the third type of call connection if the signal is not received within the predetermined time period and if the first type of call connection is not supported.

30. An apparatus for establishing a connection in a communication network, comprising:
    signaling means for transmitting negotiation signaling for initiating a call;
    monitoring means for monitoring the negotiation signaling for a response to the negotiation signaling;
    checking means for determining, based on the response, whether a first type of call connection for implementing the call is supported; and
    connection control means for automatically initiating a third type of call connection if the first type of call connection is not supported, and for automatically implementing the call through a second type of call connection if the first type of call connection is not supported and if a received signal indicates that the second type of call connection is supported, and for maintaining the third type of call connection if the first type of call connection and the second type of call connection are not supported.

31. A computer-readable medium encoded with a computer program executed by a computer that causes establishment of a connection in a communication network, comprising:
    program code for monitoring negotiation signaling for initiating a call;
    program code for determining whether a first type of call connection is supported based on the monitored negotiation signaling;
    program code for implementing the call through the first type of call connection if the first type of call connection is supported;

program code for simultaneously initiating a second type of call connection and a third type of call connection if the first type of call connection is not supported;

program code for detecting a signal which indicates that the second type of call connection is supported;

program code for implementing the call through the second type of call connection if the second type of call connection is supported; and program code for maintaining the third type of call connection if the second type of call connection is not supported.

32. A computer-readable medium encoded with a computer program executed by a computer that causes establishment of a connection in a communication network, comprising:

program code for automatically initiating a second type of call connection;

program code for monitoring signaling information for a signal indicating that the second type of call connection is supported;

program code for determining whether a first type of call connection is supported based on the monitored signaling information;

program code for implementing a call through the first type of call connection if the first type of call connection is supported;

program code for automatically initiating a third type of call connection if the first type of call connection is not supported;

program code for implementing the call through the second type of call connection if the first type of call connection is not supported and the signal is received; and program code for maintaining the third type of call connection if the signal indicating that the second type of call connection is supported is not received and the first type of call connection is not supported.

* * * * *